(12) United States Patent
Bona et al.

(10) Patent No.: US 6,766,083 B2
(45) Date of Patent: Jul. 20, 2004

(54) TUNABLE COUPLER DEVICE AND OPTICAL FILTER

(75) Inventors: Gian-Luca Bona, Hedingen (CH); Christian W J Berendsen, Copenhagen (DK); Folkert Horst, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/268,638

(22) Filed: Oct. 10, 2002

(65) Prior Publication Data

US 2003/0072534 A1 Apr. 17, 2003

(30) Foreign Application Priority Data

Oct. 16, 2001 (EP) ............................................. 01811014

(51) Int. Cl.[7] ................................................ G02B 6/26
(52) U.S. Cl. ........................................ 385/40; 385/32
(58) Field of Search ............................. 385/30, 31, 32, 385/39, 40–45, 50, 3

(56) References Cited

U.S. PATENT DOCUMENTS

| | | | | |
|---|---|---|---|---|
| 4,035,058 A | * | 7/1977 | Papuchon | 385/40 |
| 4,786,130 A | * | 11/1988 | Georgiou et al. | 385/48 |
| 4,805,975 A | * | 2/1989 | Utaka et al. | 385/18 |
| 4,818,050 A | * | 4/1989 | Duthie | 385/17 |
| 5,123,069 A | * | 6/1992 | Okayama et al. | 385/16 |
| 5,224,185 A | * | 6/1993 | Ito et al. | 385/40 |
| 5,329,601 A | * | 7/1994 | Nakamura | 385/41 |
| 5,712,935 A | * | 1/1998 | Miyakawa | 385/22 |
| 6,222,964 B1 | * | 4/2001 | Sadot et al. | 385/40 |

* cited by examiner

Primary Examiner—Ellen E. Kim
(74) Attorney, Agent, or Firm—Moser, Patterson & Sheridan, LLP.; Kin-Wah Tong, Esq.; Wan Yee Cheung, Esq.

(57) ABSTRACT

An electrically tunable coupler device is disposed on a substrate comprising a first and a second waveguide, for guiding optical signals. The coupler device comprises a heater element disposed adjacent the first waveguide for thermo-optically shifting the phase of the optical signal in the first waveguide in response to a control voltage applied to the heater element. The heater element is disposed in an interaction region of the optical signals, such that, within the interaction region, a temperature gradient across the first and the second waveguide is generated in dependence on the applied control voltage. A heat sink element can be disposed adjacent the second waveguide to absorb thermal energy from the heater element. This device can be fabricated at reduced cost and in increased packing density and is usable e.g. in directional couplers, Mach-Zehnder interferometers, optical ring resonators, IIR filters, or optical modulators.

16 Claims, 5 Drawing Sheets

PRIOR ART

TUNABLE COUPLER DEVICE AND OPTICAL FILTER

The present invention relates to a tunable coupler device according to claim 1 and an optical filter incorporating said tunable coupler device according to claim 11.

More particularly, the present invention relates to a tunable coupler device designed for use in devices including but not limited to directional couplers, Mach-Zehnder interferometers, optical ring resonators, infinite impulse response filters, dispersion compensating devices, add-drop multiplexers, optical wavelength converters or optical modulators.

BACKGROUND OF THE INVENTION

An optical signal is often split from one input port to two output ports for signal distribution or monitoring. This can be accomplished passively by using a directional coupler with two separate single-mode waveguides which are brought together for some interaction region. A gaussian-shaped single-mode wave propagating in a waveguide will have most of its energy residing in the core accompanied by an evanescent field tail propagating alongside the core within the cladding region. The evanescent tail of a single-mode wave, which is propagating along the interaction region in a first waveguide of a directional coupler, will therefore partially fall into the range of the second waveguide exciting an optical wave therein. In this way power is gradually coupled from the first to the second waveguide (see Mool C. Gupta, Handbook of PHOTONICS, CRC Press, Boca Raton 1997, pages 642–646).

According to Govind P. Agrawal, Fiber Optic Communication Systems, Wiley Series in microwave and optical engineering, New York 1992, chapter 6.2.1, pages 232–234, optical signals can be modulated by means of a Mach-Zehnder interferometer comprising two arms wherein the phase of optical carrier signals is shifted according to electrical binary data. As long as the phase of the optical carrier signals, which originate from the same source, is identical, the corresponding optical fields interfere constructively. An additional phase shift of adequate size introduced in one of the arms destroys the constructive nature of the interference of the optical carrier signals which are superpositioned on an output line of the ASK-modulator. The additional phase shift in the given example is introduced through voltage-induced index changes of the electro-optic materials (e.g. $LiNbO_3$) used for said arms of the Mach-Zehnder interferometer.

In C. K. Madsen, G. Lenz, A. J. Bruce, M. A. Capuzzo and L. T. Gomez, Phase Engineering Applied to Integrated Optical Filters, IEEE Lasers and Electro-Optics Society, $12^{th}$ annual meeting, San Francisco 1999, allpass filter rings and linear delay response architectures for dispersion compensations are described. A basic ring architecture consists of a tunable optical waveguide ring which is coupled to an optical waveguide through which optical signals are transferred. The thermo-optic effect is used to shift the phase of the signals within the ring. In order to obtain a desired filter response, it is critical to accurately fabricate the desired coupling ratio. To reduce the fabrication tolerances on the couplers and simultaneously to obtain a fully tunable allpass response, the basic ring architecture is preferably enhanced with a Mach-Zehnder interferometer (see FIG. 1). This enhanced ring structure, below called ring resonator, is briefly explained with reference to FIGS. 1 and 2.

FIG. 1 shows a prior art tunable balanced Mach-Zehnder interferometer with a first and a second waveguide 10, 11 aligned in parallel, with a first and a second directional coupler 31, 32, through which optical signals can be exchanged between said waveguides 10, 11, and with one thin-film heater 21 covering a part of the first waveguide 10 lying between the directional couplers 31, 32. An optical signal entering the first waveguide 10 at port A will partially be coupled in the first directional coupler 32 to the second waveguide 11. Between the directional couplers 31, 32 the phase of the remainder of the optical signal transferred in the first waveguide 10 will be shifted according to the thermal energy applied to the first waveguide 10 by means of the thin-film heater 21. The optical signal in the first waveguide 10 then interferes in the second directional coupler 32 with the optical signal of the second waveguide 11. Depending on the phase relationship between the optical signals, the signal intensity in the second waveguide 11 will be increased or reduced.

In case that the second waveguide 11 is formed as a ring and enhanced with a thin-film heater 22 for phase-shifting purposes, then the architecture shown in FIG. 1 corresponds to the tunable ring resonator shown in FIG. 2 respectively [3], FIG. 1 which may be used for dispersion compensation.

In order to obtain a desired shift of the phase of the optical signal in the first waveguide 10 relative to the phase of the optical signal in the second waveguide 11, thermal energy provided by the thin-film heater 21 is applied to the first waveguide 10 and not to the second waveguide 11. In the region of the thin-film heater 21 the waveguides 10, 11 are traditionally spaced apart at a distance which is sufficient to avoid a transfer of thermal energy from the thin-film heater 21 to the second waveguide 11.

Since the waveguides 10, 11 of the tunable ring resonator are kept apart from each other between the directional couplers 31, 32 over a relatively long distance, the architectures shown in FIGS. 1 and 2 are difficult to realize in small sizes as required for high frequency applications operating for example in the range of 25 GHz to 75 GHz.

It would therefore be desirable to create an improved tunable coupler device.

It would be desirable in particular to create a tunable coupler device which in conjunction with related circuitry can be fabricated at reduced cost and in high packing density.

More particularly it would be desirable to create a tunable coupler device which can easily be fabricated in planar waveguide technology.

It would further be desirable to create a tunable coupler device designed for use in devices including but not limited to directional couplers, Mach-Zehnder interferometers, optical ring resonators, infinite impulse response filters, dispersion compensating devices, add-drop multiplexers, optical wavelength converters or optical modulators.

SUMMARY OF THE INVENTION

The above and other objects of the present invention are achieved by a device according to claim 1 and a tunable optical filter according to claim 11.

The tunable coupler device is disposed on a substrate, comprising a first and a second waveguide for guiding optical signals, and comprising a heater element disposed adjacent the first waveguide in order to shift the phase of the optical signal in the first waveguide by means of the thermo-optic effect in response to a control voltage applied to the heater element. The heater element is disposed in an interaction region of the optical signals, such that, within the interaction region, a temperature gradient across the first and the second waveguide is generated in dependence on the applied control voltage. In order to increase the temperature gradient, the substrate may be designed to absorb thermal energy.

In order to further increase the temperature gradient, the heater element can be disposed adjacent the first waveguide and a heat sink element can be disposed adjacent the second waveguide such that thermal energy which passes from the heater element to the first and partially to the second waveguide is absorbed by the heat sink element.

In case that the second waveguide is formed as a closed loop or a ring, the heat sink element can be placed within said loop or ring, thereby reducing hindering the placement of further elements on the substrate.

Regions wherein optical signals are interacting and the region wherein the phase of the optical signals is shifted are therefore not separated in the tunable coupler device. Compared to prior art tunable couplers such as the balanced Mach-Zehnder interferometer shown in FIG. 1, which comprises two directional couplers enclosing a phase-shifting device, the herein described tunable coupler device comprises an overlapping phase-shifting and coupling section. The tunable coupler device can therefore be realized in significantly reduced size capable of operating in higher frequency regions.

In order to further reduce the size of the tunable coupler device for example implemented in optical filters the first waveguide can be bent along the second waveguide in the coupling region, so that the first or the second waveguide can be designed as ring with reduced diameter.

In a preferred embodiment of the invention, for example implemented in a tunable optical filter, an additional heater element is disposed adjacent the waveguide, which is forming a ring, in order to shift the phase of the optical signals circulating in the ring according to a control voltage applied to said additional heater element.

In order to improve coupling, the dimensions of the first and the second waveguide can be designed asymmetrically, the first waveguide being smaller than the second waveguide.

The heater elements preferably comprise a high resistive material such as Cr, Ni, Co or an alloy made thereof and the heat sink element and the leads connecting the heater elements to a voltage supply preferably comprise a low resistive material such as Al, Ag, Au or Cu.

The invention can be implemented advantageously in various optical circuits such as directional couplers, Mach-Zehnder interferometers, optical ring resonators, infinite impulse response filters, dispersion compensating devices, add-drop multiplexers, optical wavelength converters or optical modulators.

BRIEF DESCRIPTION OF THE DRAWINGS

Some of the objects and advantages of the present invention have been stated, others will appear when the following description is considered together with the accompanying drawings, wherein.

DETAILED DESCRIPTION OF THE PREFERRED EMBODIMENTS

Figure 1:
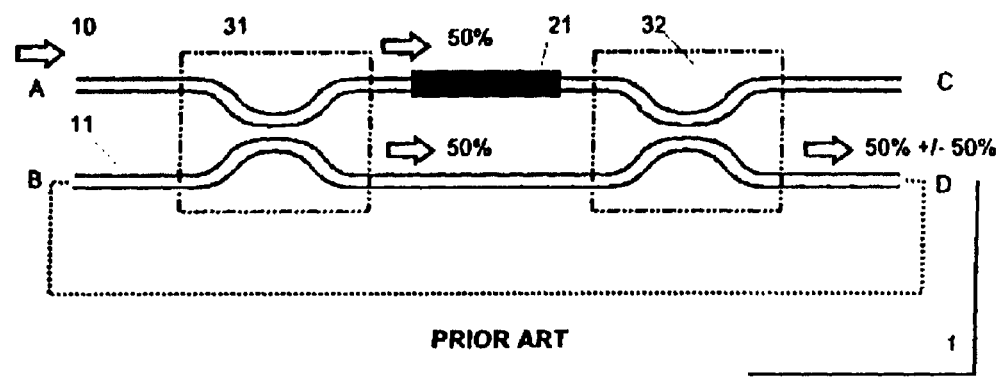
FIG. 1 shows a prior art tunable balanced Mach-Zehnder interferometer acting as a directional coupler.
Figure 2:
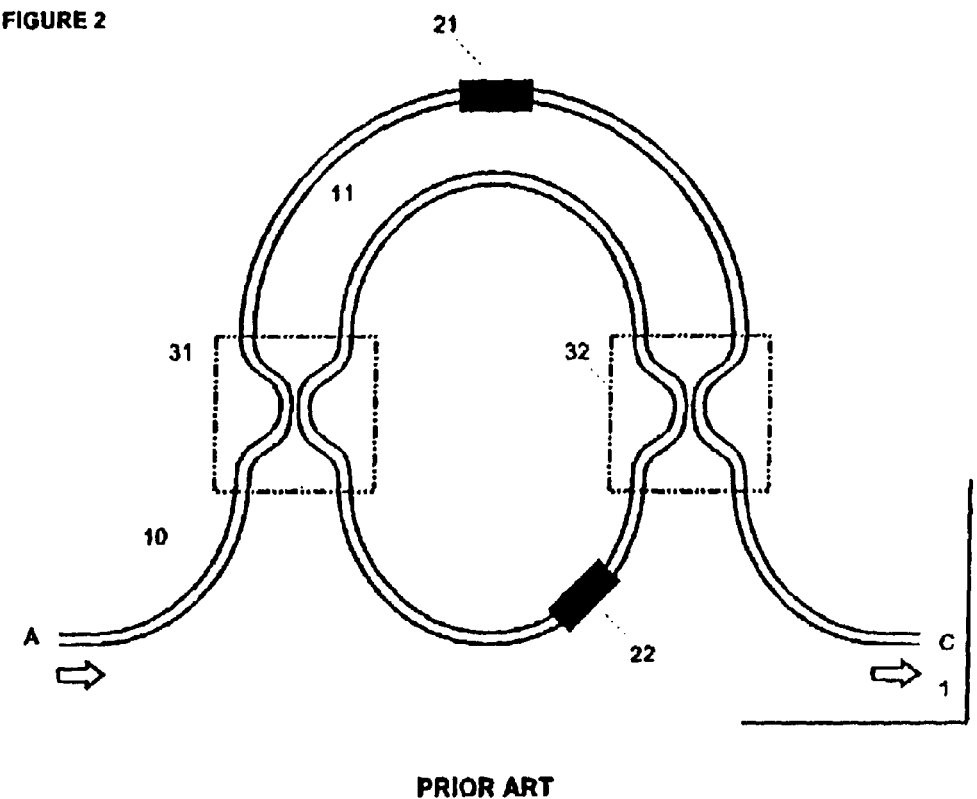
FIG. 2 shows the prior art tunable balanced Mach-Zehnder interferometer of FIG. 1 being enhanced to a tunable ring resonator.

FIG. 1 shows a tunable balanced Mach-Zehnder interferometer acting as a directional coupler. FIG. 2 shows the tunable balanced Mach-Zehnder interferometer of FIG. 1 enhanced to a tunable ring resonator. The devices shown in FIGS. 1 and 2 have been discussed above.

Figure 3:
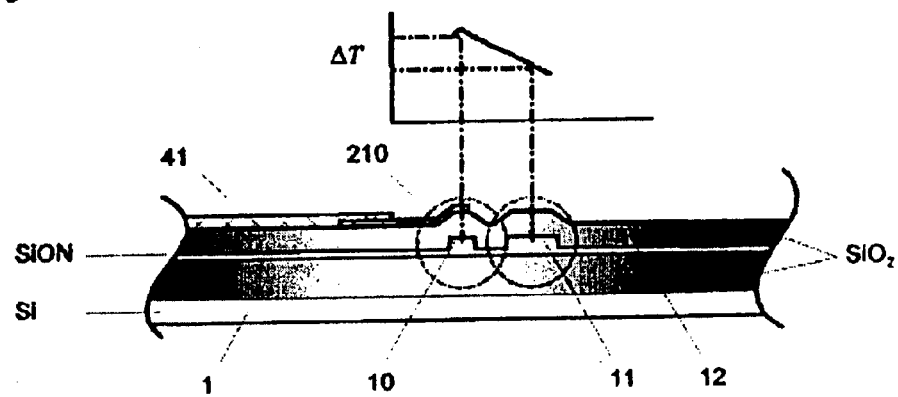
FIG. 3 shows a sectional view of a layered structure incorporating a tunable coupler device.

FIG. 3 shows a cross-sectional view of a layered structure incorporating an exemplary tunable coupler device. The tunable coupler device is disposed on a substrate 1 comprising two separate single-mode waveguides 10, 11 which are situated near each other, preferably aligned in parallel in an interaction region. The interaction region can be defined as the area wherein the mode in one waveguide is extending into the mode in the second waveguide such that an overlap of the modal fields occurs. Hence, in that region a transfer of light energy from one waveguide into the other waveguide is possible. The closer the two waveguides are to each other and the longer the two waveguides are in this region the quicker the energy transfer from one waveguide to the other takes place and vice versa.

A heater element 210 is disposed adjacent the first waveguide 10 in order to shift the phase of an optical signal guided in the first waveguide 10 by means of the thermo-optic effect in response to a control voltage applied to the heater element 210. Caused by the electrically produced thermal energy, the refractive index within the first waveguide 10 changes, resulting in an increased or reduced propagation velocity of the guided optical signal and a thereto-corresponding phase change. The substrate 1 here exemplarily is designed that it in operation absorbs thermal energy so that thermal energy is transferred from the heater element 210 to the substrate 1 thus reducing transfer of thermal energy to the second waveguide 11.

Figure 4:
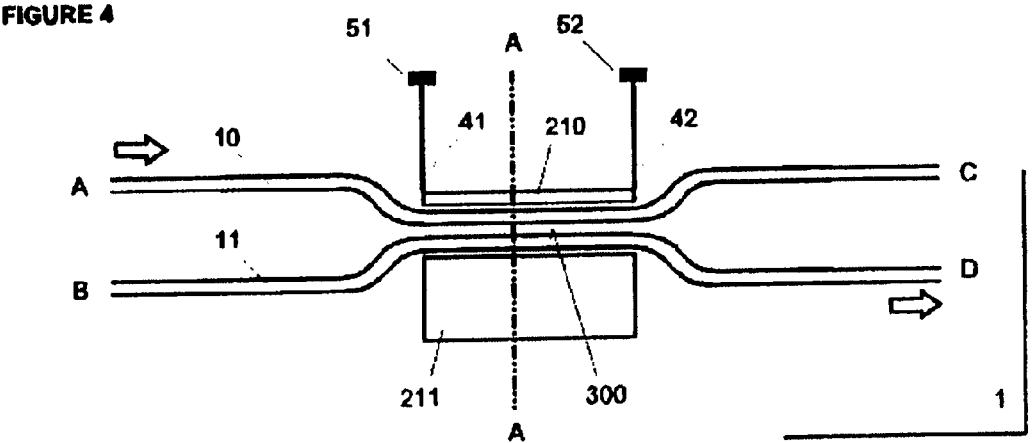
FIG. 4 schematically shows a tunable coupler device comprising a heat sink element.

In case that a control voltage is applied to the heater element 210, for example as shown in FIG. 4, over electrodes 51, 52 and leads 41, 42, a temperature gradient is produced across the first and the second waveguide 10, 11 resulting in a change of the refractive index of the first waveguide 10 that is bigger than a change of the refractive index of the second waveguide 11, thereby shifting the phase of an optical signal guided in the first waveguide 10 relative to the phase of an optical signal guided in the second waveguide 11. The temperature gradient over the first waveguide 10 is hence bigger than the temperature gradient over the second waveguide 11.

The region wherein the optical signals are interacting and the region wherein the phase of the optical signals is shifted are therefore not completely separated in the tunable coupler device. The tunable coupler device comprises a combined phase-shifting- and coupling section and can therefore be realized in a reduced size, capable of operating in higher frequency regions.

FIG. 4 schematically shows an example of a tunable coupler device comprising a heat sink element 211 which is disposed adjacent the second waveguide 11 such that thermal energy which passes from the heater element 210 to the first and partially to the second waveguide 10, 11 is absorbed thus further reducing the transfer of thermal energy to the second waveguide 11. Thermal energy coming from the heater element 210 is therefore directly and indirectly, over the heat sink element 211, forwarded to the substrate 1. The heat sink element 211 preferably has a high capacity to store thermal energy and a low thermal resistance in order to allow a rapid transfer of thermal energy.

The solution allows to shift the phase of optical signals in waveguides 10, 11, which are aligned in close proximity relative to each other. As shown in FIG. 4 the first and the second waveguide 10, 11 can therefore be disposed in the section 300 between the heater element 210 and the heat sink element 211 such that on the one hand the phase of the optical signals in the first waveguide 10 can be shifted and on the other hand light energy of optical signals can be coupled in this section 300 from the first to the second waveguide 10, 11 or vice versa. By adjusting the phase relationship of the optical signals guided in the first and in the second waveguide 10, 11 the light energy transferred to the second waveguide 11 respectively the intensity of the optical signals in the second wave guide 11 can be set to a desired value.

Figure 5:
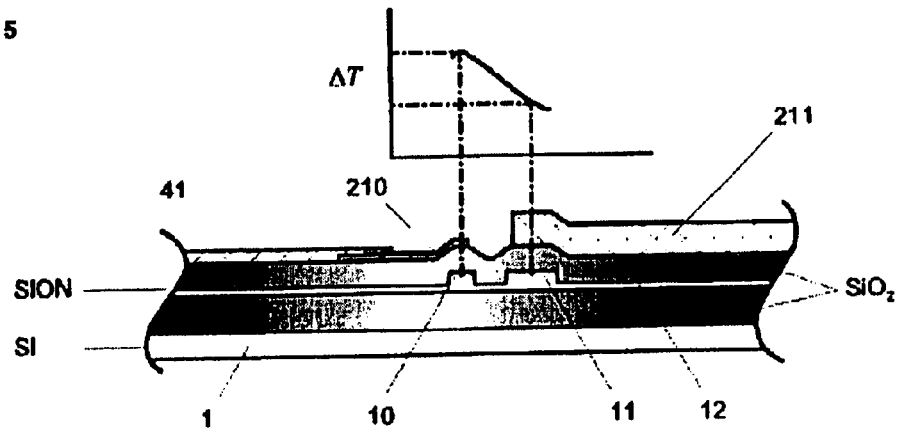
FIG. 5 shows a sectional view of the device taken along A–A' in FIG. 4.

FIG. 5 shows a sectional view of the tunable coupler device taken along A–A' in FIG. 4. The device is integrated on a substrate 1 carrying a waveguide layer made of SiON on which the first and the second waveguide 10, 11 have been formed by an etching process. On top of the waveguide layer a cladding layer 12 made of $SiO_2$, carrying the heater element 210 and the heat sink element 211, has been deposited. As shown, the heater element 210 and the heat sink element 211 may overlap the corresponding waveguide 10, 11 in order to obtain a steep temperature gradient respectively an optimised temperature difference $\Delta T$ between the waveguides 10, 11.

The heater element 210 is preferably made of a high-resistive material such as Cr, Ni, Co or a corresponding alloy. The heat sink element 211 is preferably made of low-resistive material such as Al, Au, Ag or Cu. In case that the leads 41, 42 connecting the heater 210 to a control voltage are made of the same low-resistive material, the leads 41, 42 and the heat sink element 211 can be produced within the same process stage.

Although preferred materials for realizing the invention were mentioned above, it is important to note that different materials and manufacturing technologies may be applied as well.

The described solution advantageously supports the design of architectures wherein one of the waveguides 10, 11 is being curved or being formed as a closed loop preferably as a ring with small diameter.

Figure 6:
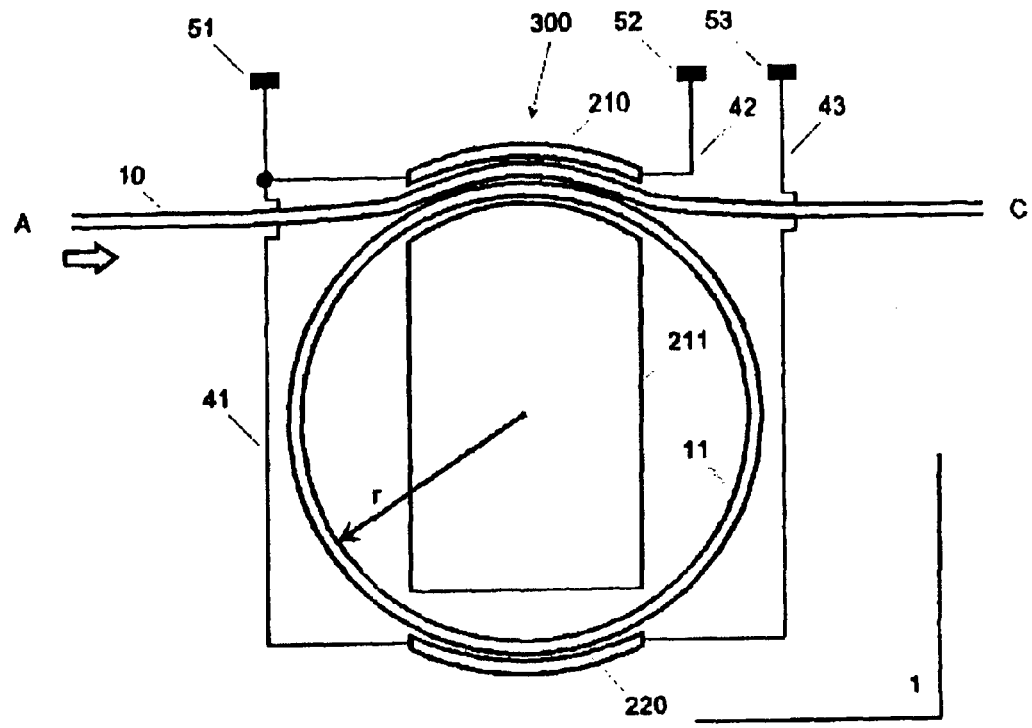
FIG. 6 shows a phase-shifting device incorporated into a ring resonator.

FIG. 6 shows a phase-shifting device incorporated into a ring resonator wherein the second waveguide 11 is formed as a closed loop. In order to obtain a simple geometrical form for the loop with a small diameter, as shown, as well as an adequate coupling between the first and the second waveguide 10, 11, a section of the first waveguide 10 and the corresponding heater element 210 are bent along the second waveguide 11. The length of the heater element 210 to obtain desired phase shifts depends on the operating frequency and is, at frequencies in the range from 25 GHz to 50 GHz, preferably in the range ¼ of the loop length or larger.

In order to shift the phase of the optical signals in the second waveguide 11, an additional heater element 220 is disposed adjacent the second waveguide 11. In response to a control voltage applied, the concerned section of the second waveguide 11 is heated resulting in a corresponding change of the refractive index and the phase of the optical signals transferred. As shown in FIG. 6, the additional heater element 220 is connected over leads 41, 43 to electrodes 51, 53 to which a control voltage can be applied.

Figure 7:
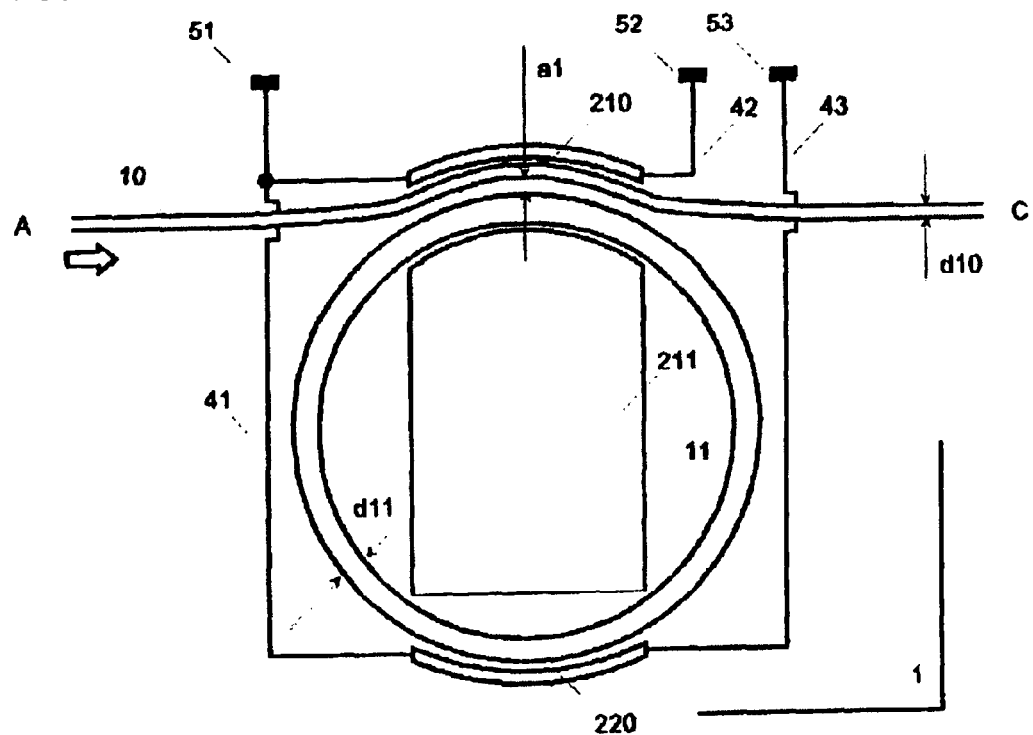
FIG. 7 shows the ring resonator of FIG. 5 fabricated in preferred dimensions.

In order to obtain a desired coupling range in coupling sections 300 with bent waveguides 10, 11, the dimensions of the waveguides 10, 11 are preferably selected asymmetrical, the first waveguide 10 being smaller than the second waveguide 11 (see FIG. 5 and FIG. 7). Good results will be achieved in SiON planar waveguide technology with a distance a1 between the first and the second waveguide 10, 11 which corresponds approximately to the diameter d10 of the first waveguide 10 and with a radial diameter d11 of the second waveguide 11 being approximately double the size of the diameter d10 of the first waveguide 10. With other technologies dimensions should be adapted accordingly.

Figure 8:
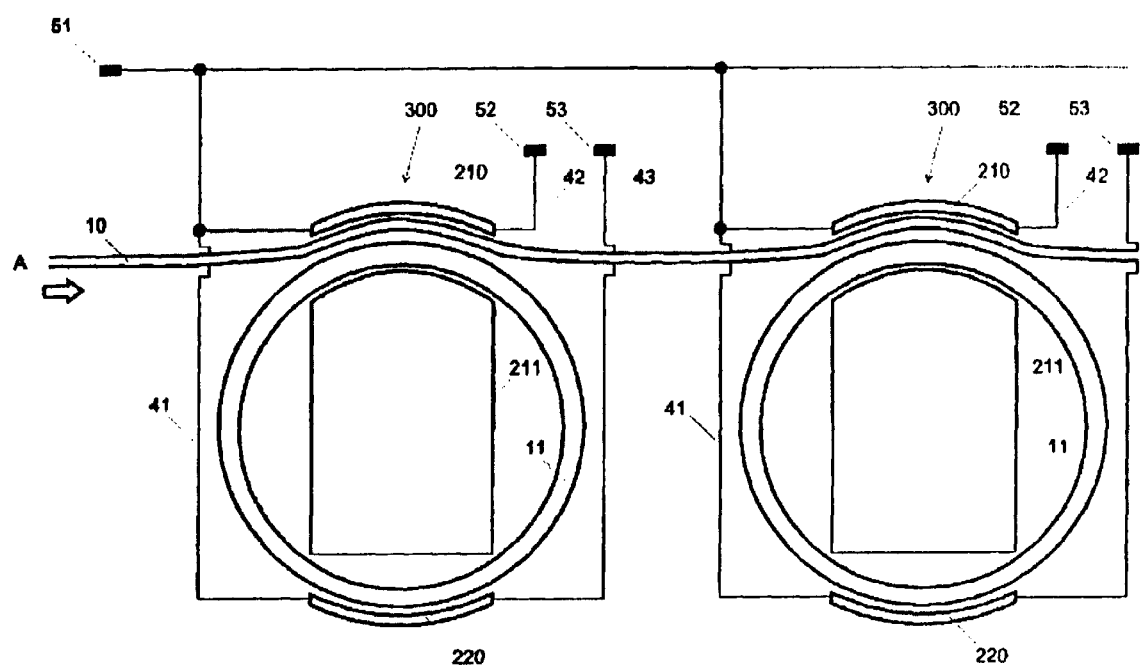
FIG. 8 shows two ring resonators according to FIG. 6 coupled in series.

The ring resonators shown in FIG. 6 and FIG. 7 can be coupled in series thus forming a tunable filter chain. FIG. 8 shows two serially coupled ring resonators according to FIG. 7. Filter ring architectures can be used for dispersion compensation. Architectures incorporating the solution can be realized in smaller dimensions and can therefore be applied in higher frequency regions. In addition the simplified resonator architectures can be fabricated at reduced cost.

As described above, the solution can advantageously be applied in further devices suitable for operating in high frequency ranges wherein the phase of signals is to be shifted and light energy is coupled from a first to a second waveguide. Excellent results can be achieved in architectures with curved waveguides.

Figure 9:
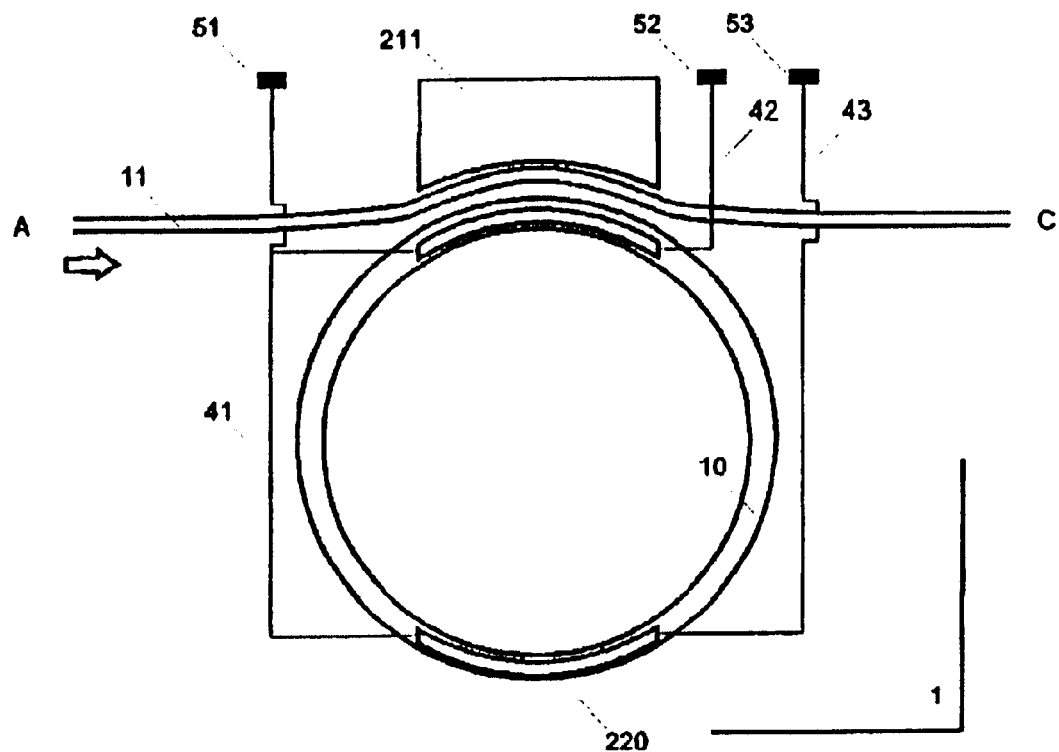
FIG. 9 shows a further embodiment of the ring resonator of FIG. 5.

The tunable coupler device can be realized in various different embodiments. FIG. 9 shows a further embodiment of the ring resonator of FIG. 6 with the heat sink element 211 disposed adjacent the first waveguide 10 and the heater elements 210, 220 disposed above the second waveguide 11.

Figure 10:
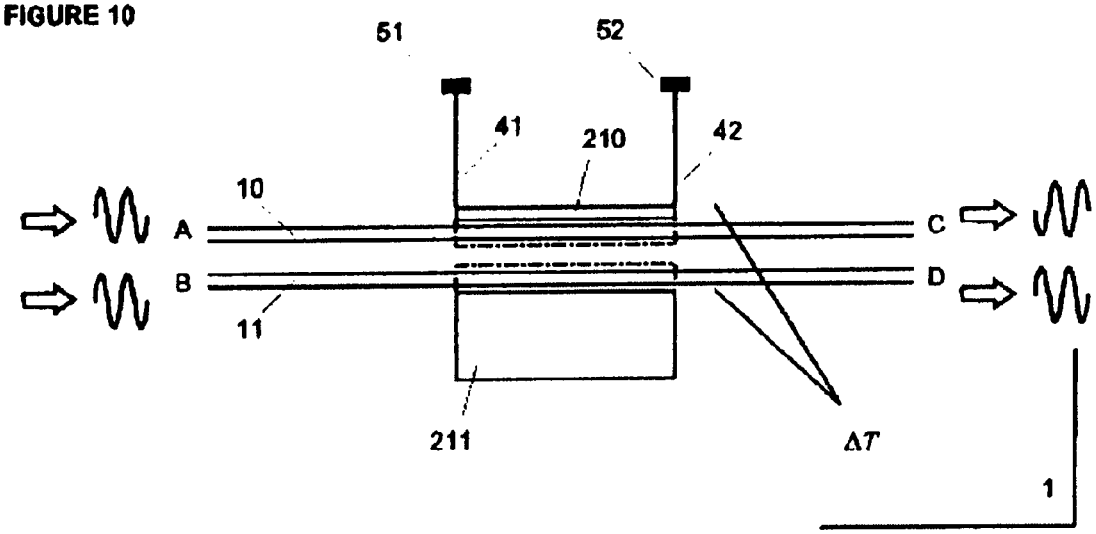
FIG. 10 shows a phase-shifting device comprising a heater and a heat sink element.

FIG. 10 shows a phase-shifting device disposed on a substrate 1 comprising a first and a second waveguide 10, 11 aligned in parallel at a distance where no or only negligible interaction between transferred optical signals occurs. A heater element 210 is disposed adjacent the first waveguide 10 for shifting the phase of optical signals transferred in the first waveguide 10 by means of the thermo-optic effect in accordance to a control voltage applied to the heater element 210. The implementation of this phase-shifting device allows to realize tunable devices such as the tunable balanced Mach-Zehnder interferometer shown in FIG. 1 in smaller dimensions.

What is claimed is:
1. An electrically tunable coupler device disposed on a substrate, comprising:
   a first and a second waveguide for carrying, respectively, first and second optical signals, said first and second waveguides being disposed in a spaced-apart orientation relative to each other; and
   a heater element adjacent the first waveguide for thermo-optically inducing first and second phase shifts, respectively, in an the first and second optical signals in response to a control voltage applied to the heater element, wherein the heater element is disposed in an interaction region of the first and second optical signals, for generating within the interaction region a temperature gradient across the first and the second waveguides, the temperature gradient decreasing from the first waveguide to the second waveguide.

2. The device according to claim 1, wherein the heater element is disposed adjacent the first waveguide and a heat sink element is disposed adjacent the second waveguide such that thermal energy which passes from the heater element to the first and partially to the second waveguide is absorbed by the heat sink element thus increasing the temperature gradient across the first and the second waveguide.

3. The device according to claim 2, wherein one of the heater element and the heat sink element at least partially covers a section of one of the first and the second waveguide.

4. The device according to claim 1, further comprising: one of the first waveguide and the second waveguide being curved or formed as a closed loop.

5. The device according to claim 4, wherein the first and the second waveguide are approximately aligned in parallel and bent in the interaction region of the optical signals.

6. An optical filter comprising an electrically tunable coupler device according to claim 5.

7. The optical filter according to claim 6, comprising:
the heater element assigned to the tunable coupler device; and
an additional heater element disposed adjacent the additional waveguide which forms a closed loop, wherein the heater elements are connected to control voltages for adjusting the coupling between the first waveguide and the second waveguide and the phase of optical signals in the additional waveguide.

8. The optical filter according to claim 6, further comprising at least two waveguide rings forming an infinite impulse response filter, serially coupled to one of the waveguides with the heater element disposed adjacent the waveguides.

9. The device according to claim 4, wherein one of the waveguides is smaller than the other waveguide.

10. The device according to claim 9, wherein the distance between the first and the second waveguide corresponds approximately to the diameter of the smaller waveguide wherein the radial diameter of the larger waveguide is approximately double the size of the diameter of the smaller waveguide.

11. The device according to claim 4, further comprising: an additional heater element disposed adjacent one of the first waveguide and second waveguide, which is forming a closed loop, in order to thermo-optically shift the phase of the optical signal carried therein in response to a control voltage applied to said additional heater element.

12. The device according to claim 1, wherein an etched waveguide layer on the substrate is covered by a cladding layer on which the heater elements and the heat sink element are disposed.

13. The device according to claim 1, wherein the heater elements comprise a high-resistive material selected from the group consisting of Cr, Ni, Co.

14. The device according to claim 1, wherein the heat sink element comprises a low-resistive material selected from the group consisting of Al, Ag, Au or Cu.

15. An electrically tunable coupler device disposed on a substrate, comprising:
a first waveguide for carrying a first optical signal; and
a second waveguide for carrying a second optical signal, wherein one of the first waveguide and the second waveguide is smaller than the other waveguide and one of tie first waveguide and the second waveguide is formed as a curve or loop, and wherein the first and second waveguides are spaced-apart by a distance that is approximately equal to a diameter of the smaller waveguide and a diameter of the larger waveguide is approximately double the diameter of the smaller waveguide; and
a heater element adjacent the first waveguide, for thermo-optically inducing first and second phase shifts, respectively, in the first and second optical signals in response to a control voltage applied to the heater element, wherein the heater element is disposed in an interaction region of the first and second optical signals, for generating within the interaction region a temperature gradient across the first and the second waveguides, the temperature gradient decreasing from the first waveguide to the second waveguide.

16. An optical filter including an electrically tunable coupler device disposed on a substrate, the electrically tunable coupler device comprising:
a first waveguide for carrying a first optical signal;
a second waveguide for carrying a second optical signal;
wherein the first and second waveguide rings one of the first waveguide and the second waveguide is formed as a curve or loop, the first and second waveguides being approximately aligned in parallel and bent in an interaction region of the first and second optical signals;
a first waveguide ring;
at least a second waveguide ring, the first and second waveguide rings forming an infinite impulse response filter that is serially coupled to one of the first waveguide and the second waveguide; and
a heater element adjacent the first waveguide for thermo-optically inducing first and second phase shifts, respectively, in the first and second optical signals in response to a control voltage applied to the heater element, wherein the heater element is disposed in the interaction region of the first and second optical signals, for generating within the interaction region a temperature gradient across the first and the second waveguides, the temperature gradient decreasing from the first waveguide to the second waveguide.

* * * * *